(12) United States Patent
Alanen et al.

(10) Patent No.: US 6,647,274 B1
(45) Date of Patent: *Nov. 11, 2003

(54) RADIO TELEPHONE WITH INITIAL DELAY BEFORE PERFORMING A PREDETERMINED FUNCTION

(75) Inventors: Heikki Alanen, Halikko (FI); Kimmo Laakkonen, Salo (FI); Jouni Halme, Helsinki (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 948 days.

(21) Appl. No.: 08/803,947

(22) Filed: Feb. 21, 1997

(30) Foreign Application Priority Data

Feb. 26, 1996 (GB) ............................................. 9604245

(51) Int. Cl.⁷ ................................................. H04B 1/38
(52) U.S. Cl. .................................. 455/550; 379/433.12
(58) Field of Search ................................. 379/428, 433, 379/434, 433.01, 433.12; 455/550, 567, 575, 90, 128, 347, 348, 349, 351, 575.1, 575.4

(56) References Cited

U.S. PATENT DOCUMENTS

| | | | |
|---|---|---|---|
| 4,845,772 A | 7/1989 | Metroka et al. | ............... 379/61 |
| 5,175,759 A | 12/1992 | Metroka et al. | ............... 379/58 |
| 5,371,781 A | 12/1994 | Ardon | ......................... 379/59 |
| 5,636,265 A * | 6/1997 | O'Connell et al. | ......... 455/412 |
| 5,724,667 A * | 3/1998 | Furuno | ........................ 455/575 |

FOREIGN PATENT DOCUMENTS

| | | |
|---|---|---|
| EP | Pub 0414365 A2 | 2/1991 |
| EP | 0414365 A2 | 2/1991 |
| EP | Pub 0414365 A3 | 2/1991 |
| EP | 0536578 A2 | 4/1993 |
| GB | 2253967 A | 9/1992 |

* cited by examiner

Primary Examiner—Nguyen T. Vo
(74) Attorney, Agent, or Firm—Perman & Green, LLP (57) ABSTRACT

A radio handset comprises a housing having a key pad including a plurality of keys mounted on a main body and an extending portion mounted for movement between a first position in which a group of the plurality of keys are concealed and a second position in which the group of the plurality of keys are exposed. A processor answers a call in response to movement of the extending portion. The processor delays answering the call for a period during which generation of a predefined cancellation signal cancels answering the call.

19 Claims, 7 Drawing Sheets

RADIO TELEPHONE WITH INITIAL DELAY BEFORE PERFORMING A PREDETERMINED FUNCTION

BACKGROUND TO THE INVENTION

The invention relates to a radio telephone sometimes termed a radio handset and more particularly to a compact radio handset.

There is a general drive in the field of mobile telephony to produce more compact telephone arrangements particularly for ease of transportation. There is, however, a conflicting, mainly psychological, requirement for a telephone to bridge the gap between the users ear and mouth to approximate the feel of using of a radio handset to that of a traditional landline telephone.

One of the ways in which this has been achieved is by providing a hinged flap attached to the main body of the telephone that is pivoted to a position in which it overlaps the main body when stowed but extends the overall length of the phone when in use. One example of such a phone is found in U.S. Pat. No. 4,845,772.

Such phones do, however, tend to be relatively flimsy and prone to damage especially when the flap is open since it is then extremely prone to accidental knocks or other rough treatment. The hinged flap also presents the difficulty of implementing a reliable conductive path from the microphone to the main body of the telephone across the hinge.

Another arrangement that overcomes some of the disadvantages inherent with a hinged flap is described in EP 0 414 365. The compact telephone or handset described in this patent comprises a main body and a cover portion arranged for longitudinal sliding movement relative to the main body. In the retracted position the phone is compact and easy to store. In the extended position the phone is dimensioned such that it comfortably bridges the gap between the user's ear and mouth. The design is both compact and relatively robust.

In the handset described in EP 0 414 365 the connection enabling the call answer/send mode is only made when the cover portion is in its fully extended position. Hence the handset can only be used for making or answering a call when the cover is in its fully extended position. The action of closing the sleeve terminates a call, regardless of whether it is incoming or outgoing.

SUMMARY OF THE INVENTION

In accordance with a first aspect of the present invention there is provided a radio handset comprising a housing having user input means and a processor operable to perform a predetermined function in response to user input of a predefined actuation signal, wherein the processor is operable to delay performance of the predetermined function for a period during which user generation of a predefined cancellation signal cancels performance of the predetermined function.

By providing a period of delay between the initiation and performance of a function, the user is provided with the opportunity to cancel performance of the function by provision of a predefined cancellation signal. The present invention allows for this opportunity to be realised.

Suitably the housing provides the user input means and comprises a key pad including a plurality of keys mounted on a main body and an extending portion mounted for movement between a first position in which a group of the plurality of keys are concealed and a second position in which the group of the plurality of keys are exposed, and wherein the processor is operable to perform the predetermined function in response to movement of the extending portion.

The predetermined function preferably comprises placing the handset in the off-hook condition for receiving an incoming call.

One desirable option for a radio telephone is that moving the extending portion from the closed position serves to answer an incoming call as the user will likely wish to extend the handset in order to participate in a conversation. By enabling this movement to provide the additional function of answering the call allows the user to avoid performing an additional function to answer the call once the handset has been made physically ready for communication with another party. However, there is a problem. Often, extending the phone will be an automatic or reflex response, and if this action automatically answers a call the user may answer a call on reflection he/she would rather have left unanswered. Embodiments of the present invention provide the means by which an additional operation performed by the user in a predetermined delay period, can cancel the function initiated by movement of the extending portion.

If in the period of delay, the user reads calling line identification information on the screen, the user can cancel the receipt of an incoming call from an unwanted or inconvenient caller.

Suitably movement of the extending portion from the first position causes the handset to be placed in the off-hook condition for answering calls and movement of the extending portion to the first position causes the handset to be placed in the on-hook condition for terminating calls.

Preferably actuation of one of the plurality of keys or movement of the extending portion to the first position cancels performance of the predetermined function. A simple actuation of a key, or movement of the extending portion can accordingly cancel initiation of the off-hook condition for answering a call.

Suitably the extending portion is mounted for longitudinal slidable movement between the first and second positions and the processor means is operable to perform the predetermined functions corresponding to sequences of actuations of exposed ones of the plurality of keys for a range of positions of the extending portion. This enables exposed keys to be utilised for cancelling the function.

In accordance with a second aspect of the present invention there is provided a radio handset comprising a housing having a key pad including a plurality of keys mounted on a main body and an extending portion mounted for movement between a first position in which a group of the plurality of keys are concealed and a second position in which the group of the plurality of keys are exposed, and a processor operable to perform a predetermined function in response to movement of the extending portion, wherein the processor is operable to delay performance of the predetermined function for a period during which generation of a predefined cancellation signal cancels performance of the predetermined function.

BRIEF DESCRIPTION OF THE DRAWINGS

The invention will be described in more detail with reference to the accompanying drawings of which.

DETAILED DESCRIPTION OF THE INVENTION

Figure 1:
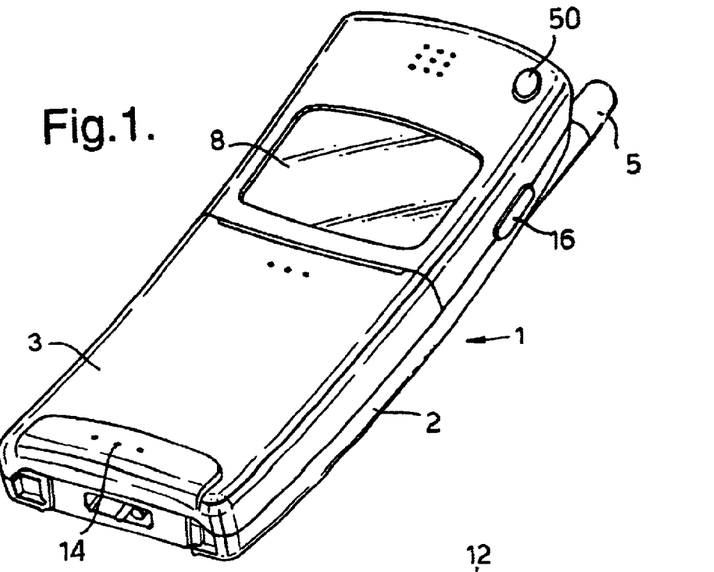
FIG. 1 is perspective view of a radio handset in accordance with the present invention with the slide cover closed.
Figure 2:
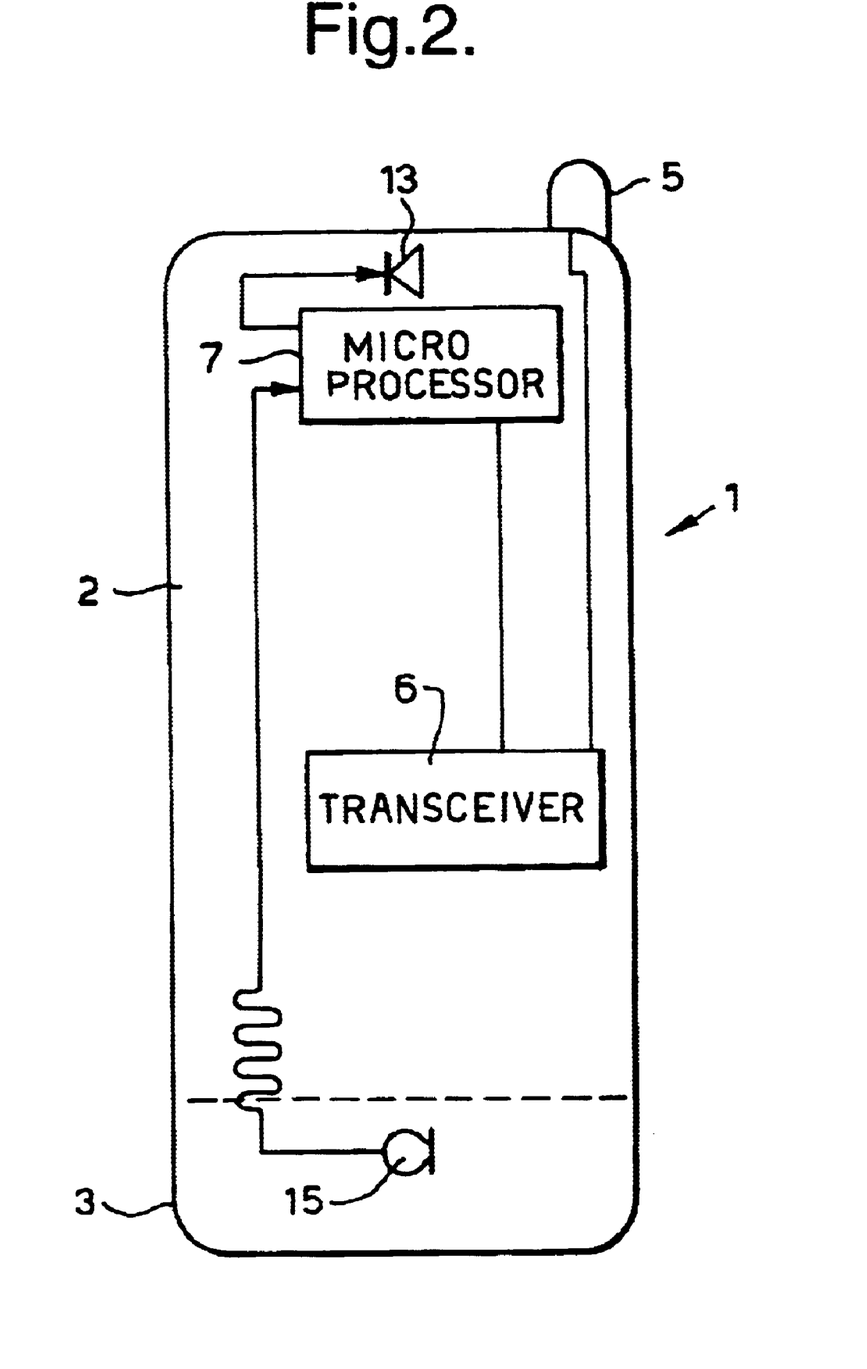
FIG. 2 is a schematic representation of a radio handset.

A radio handset in accordance with an embodiment of this invention shown in FIGS. 1 to 10 comprises a housing 1 having a main body 2 enclosing substantially the whole of the electronic circuitry of the radio telephone and a sleeve portion 3 slidably mounted on the main body 2. The handset has an antenna 5, a transceiver 6 and processing means 7 programmed with an algorithm which is operative to select a communication channel with a base station (FIG. 2). Information is displayed on a Liquid Crystal Display (LCD) 8.

Included on the housing 1 are a first group of keys or buttons 10 labelled 0–9, * and # arranged in an array of three columns and four rows, as is usual and a second group of control keys or buttons 11 for selecting various predetermined functions such as memory storage and recall, last number redial, call start (eg labelled SEND) call terminate (eg labelled END) etc, again as is usual. For the purposes of this specification the term 'key' is taken to mean key or button or any similar element for user input to the microprocessor. The display panel, LCD 8 is located on the housing above the two groups of keys. Above the display is located a series of holes 12 behind which is an earphone or speaker 13 for transmitting speech or other sounds to the user of the radio handset. The sleeve has a series of holes 14 at its lower end behind which is mounted a microphone 15 (FIG. 2).

Figure 3:
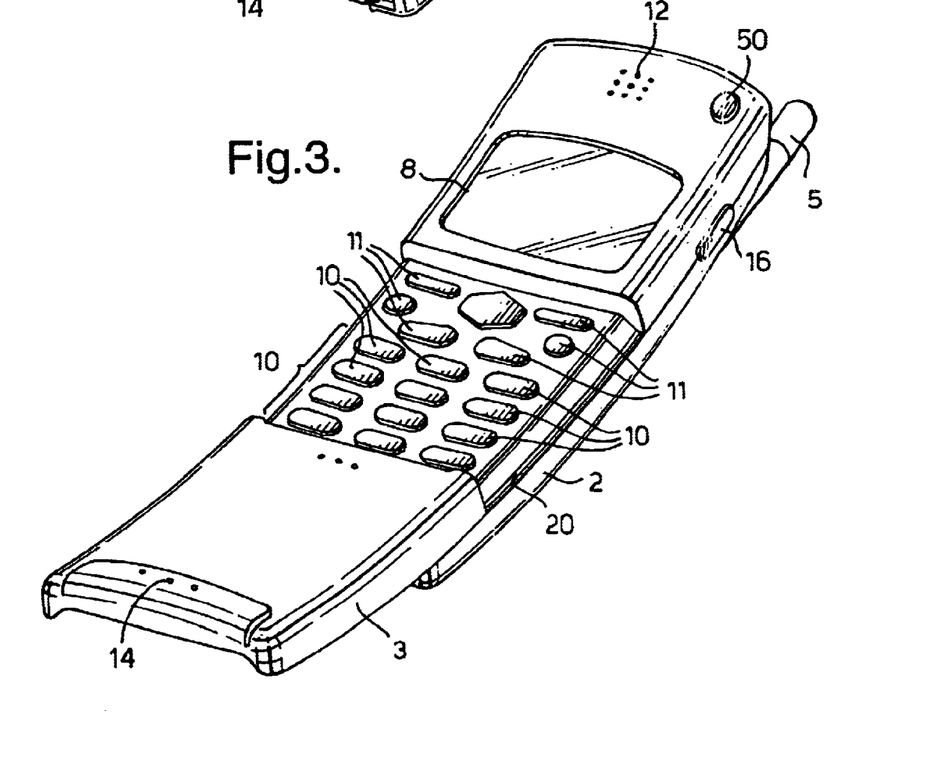
FIG. 3 is a perspective view of the radio handset of FIG. 1 with the slide cover fully open.

The sleeve portion 3 is arranged to slide relative to the main body between a closed position illustrated in FIG. 1 and a fully open position illustrated in FIG. 3. The main body of the housing is curved and the sleeve-like portion provides a curvature sufficient for the ear 13 and mouth 15 pieces to be positioned respectively adjacent the ear and mouth of the user. The material chosen for the slide of this particular embodiment of the invention is a polycarbonate with added teflon to provide a satisfying sliding feel when in use.

Figure 4:
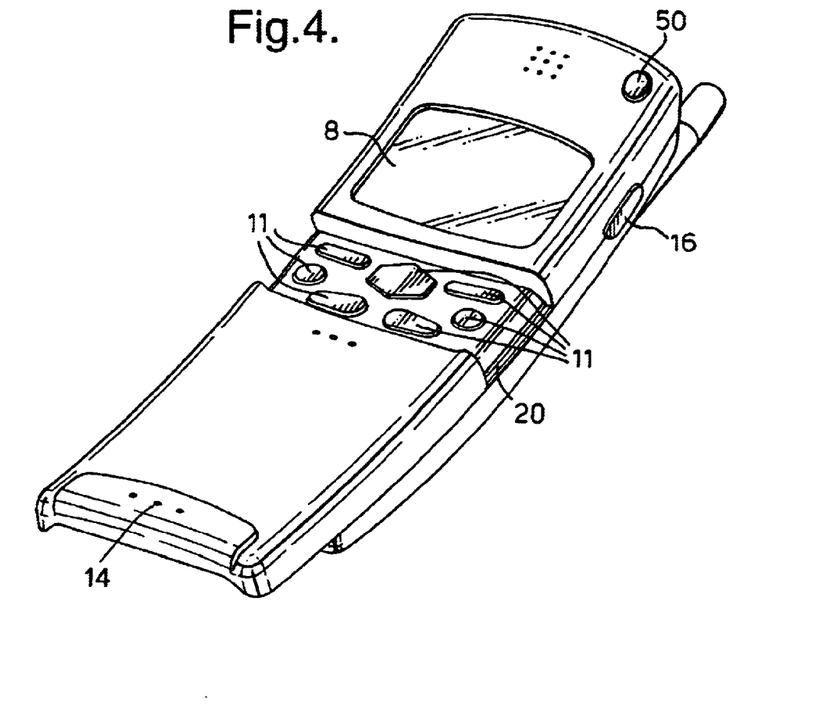
FIG. 4 is a perspective view of the radio handset of FIG. 1 with the slide cover in an intermediate position.

In the closed position, both groups of keys 10,11 are concealed (FIG. 1); the only control keys available for use being a volume control key 16 positioned on the side of the handset and a power control key 50. In the fully open position (FIG. 3) both groups of keys 10,11 are revealed allowing both numerical and control buttons to be selected. A third sleeve position is illustrated in FIG. 4 in which the sleeve is partially open showing only the second group of keys 11. In this position the control keys can still be selected but the numeric keys cannot as they are concealed. Calls can be made using the control keys ie calls from memory, and calls can be answered. In this embodiment it is the physical concealment of the keys that prevent them from being used.

Although the microprocessor 7 is functional at all times, when the numerical keys 10 of the first group are concealed they cannot physically be actuated to make a telephone call. When the sleeve is fully closed, the only key that can be actuated to perform functions other than a power key 50 is the volume key 16, a third key group, positioned on the side of the phone and revealed for all positions of the sleeve. The handset is programmed to allow actuation of the volume key 16 forming a third group of keys, when the sleeve 3 is in the closed position to answer calls. Additional keys could be exposed when the sleeve is closed.

The sleeve portion 3 is attached to the main body 2 for sliding movement relative thereto. A groove 20 is provided on each side of the main body (FIGS. 3,4,5) running substantially along its length. Runners 21 positioned, one on each side of the underside of the sleeve portion (FIG. 9), are held in the grooves to allow the sleeve portion 3 to slide relative to the main body 1 whilst being captured thereby.

In the embodiment described, the arrangement of the groups of keys is such that in particular positions the sleeve provides access to the respective groups. It is desirable, therefore, that there is a preference for the sleeve to be located in positions revealing either neither the first nor the second group of keys (closed) (FIG. 1), the second group of keys alone (intermediate) (FIG. 4) or both the first and second groups of keys (fully extended) (FIG. 3). The third group of keys ie the volume control button 16 in this embodiment is revealed at all times.

In order to hold the sleeve in the three preferential positions the main body of the handset is provided with a pair of members 22 (FIGS. 5,10) located within the main body that protrude one into each of the grooves 20 located on the main body 2 of the handset. The members 22 are spring loaded to allow the sleeve portion to move from the preferred positions when desired. The member 22 is resilient and mounted in a holder 24 inside the main body 2 with a detent 23 that protrudes through an aperture 25 in the groove 20. The detent 23 is depressed so that it no longer protrudes into the grooves 20 by one of the runners 21 of the sleeve portion 3. The runners are provided with recesses 26 (FIG. 9); when a recess 26 coincides with a detent 23, the sleeve 3 is held in position. The recesses 26 are provided so that the sleeve portion is 'caught' in the closed, intermediate and the fully open positions.

Two of the recesses 26 in the runners 21, those corresponding to the closed and intermediate positions have cammed edges so that when extra force is provided to slide the sleeve from the first two sleeve positions, the detent 23 is depressed below the surface of the bottom of the groove 20 for disengagement from the recess 16 allowing the sleeve portion 3 to continue to slide in the chosen direction. The recess corresponding to the intermediate position will have cammed leading and trailing edges to allow movement in either direction. The recess corresponding to the closed position may only have a cammed leading edge to allow for ease in opening.

When the sleeve is in the fully extended position it is not desirable for the sleeve to continue to open as this could result in the sleeve portion being removed from the main body of the handset. To avoid this, the third recess 26 is deeper and the abutment surface in the direction of a complete withdrawal of the sleeve portion is not cammed. This provides a more absolute stop against further extension of the sleeve portion. As a secondary measure, an in-mould plastic pin 27 (FIG. 9) is provided on each side of the sleeve portion 3 of the handset. Each of these abuts complementary surfaces located on the main body 2 of the handset to substantially prevent withdrawal of the sleeve portion 3.

Figure 9:
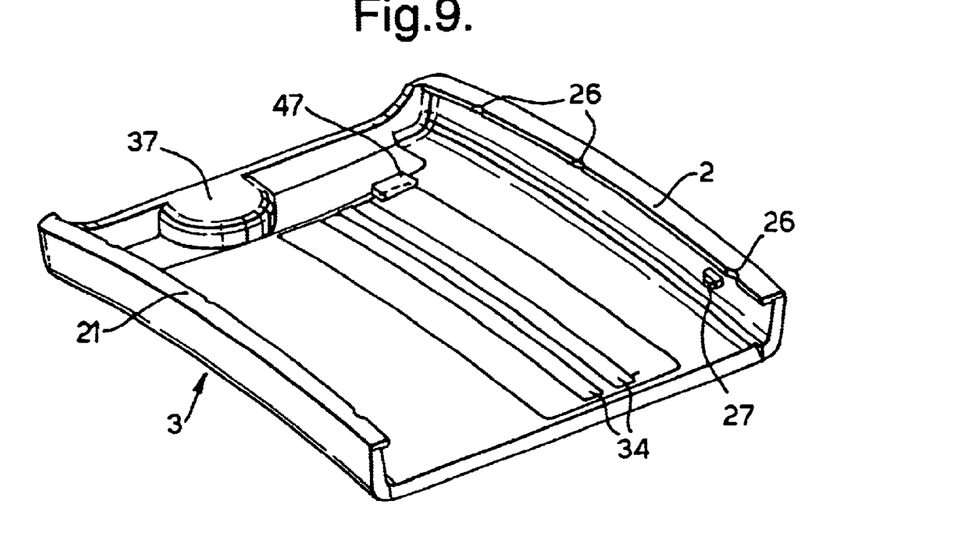
FIG. 9 is a partial perspective underside view of the slide cover of the radio handset of FIG. 1.
Figure 10:
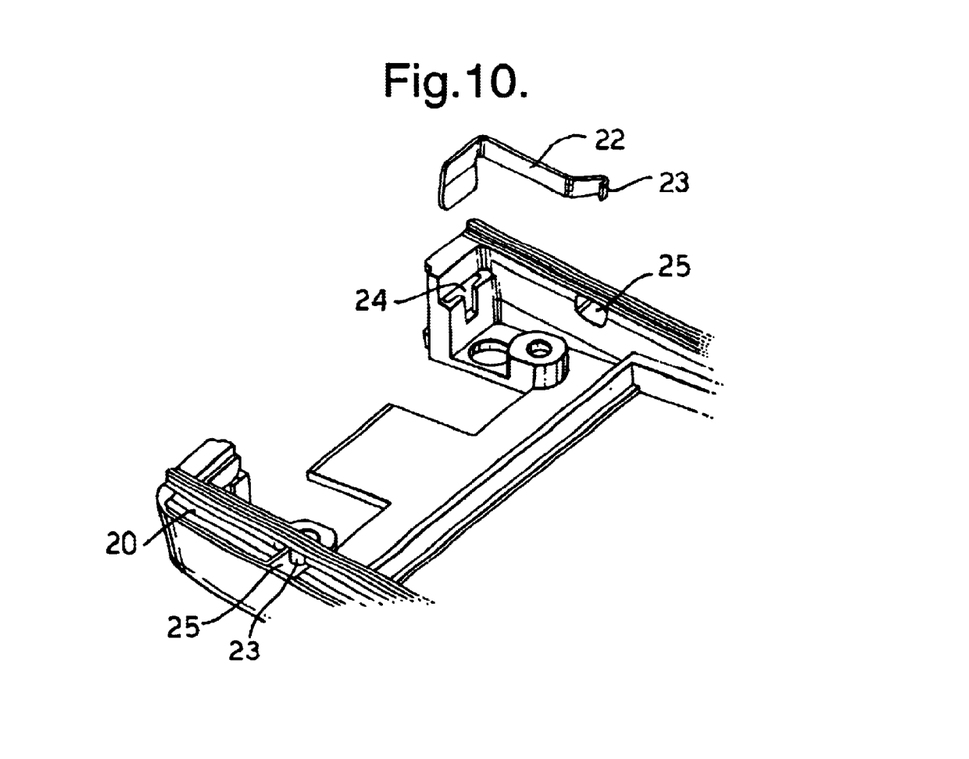
FIG. 10 is a partial perspective view of the main body of the radio handset showing the grooves for engagement with the sliding portion.
Figure 11:
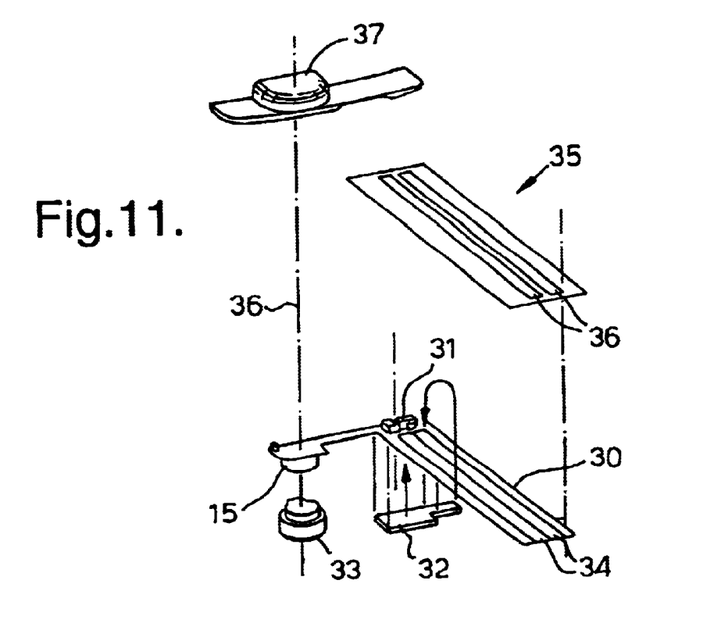
FIG. 11 is an exploded view of the microphone housing of FIG. 9.
Figure 12:
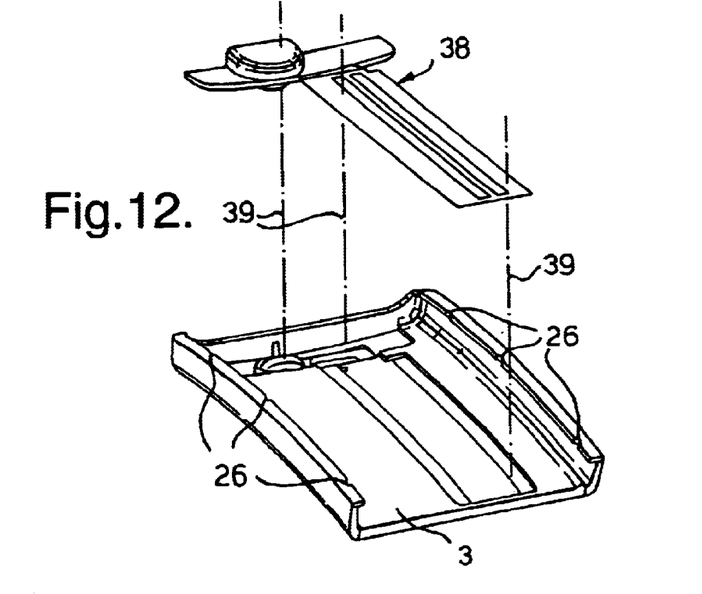
FIG. 12 is an exploded view of the sleeve and microphone housing of FIG. 9.

As can be seen from FIGS. 9, 11 and 12, the microphone 15 is mounted on a small flexible pcb 30 along with a filter 31 and a foam plastics member 32 that acts as an acoustic dampener together with microphone holder 33 to improve the acoustic properties of the microphone 15. The flexible pcb 30 also includes two conducting tracks 34 for maintaining contact between the microphone 15 and the electronics of the handset located within the housing of the main body. The flexible pcb 30 is mounted to the underside of the bare plastic sleeve itself suitably by laminating a polycarbonate foil 35 with apertures 36 coinciding with tracks 34 to it and then welding that part to the underside of the sleeve portion to the slide cover by ultrasonic welding. A microphone housing 37 surrounding the microphone 15 in the microphone holder 33 is then fitted. The resulting assembly 38 is attached to the underside of the sleeve 3 with the aid of guide pins indicated by dotted lines 39.

Figure 5:
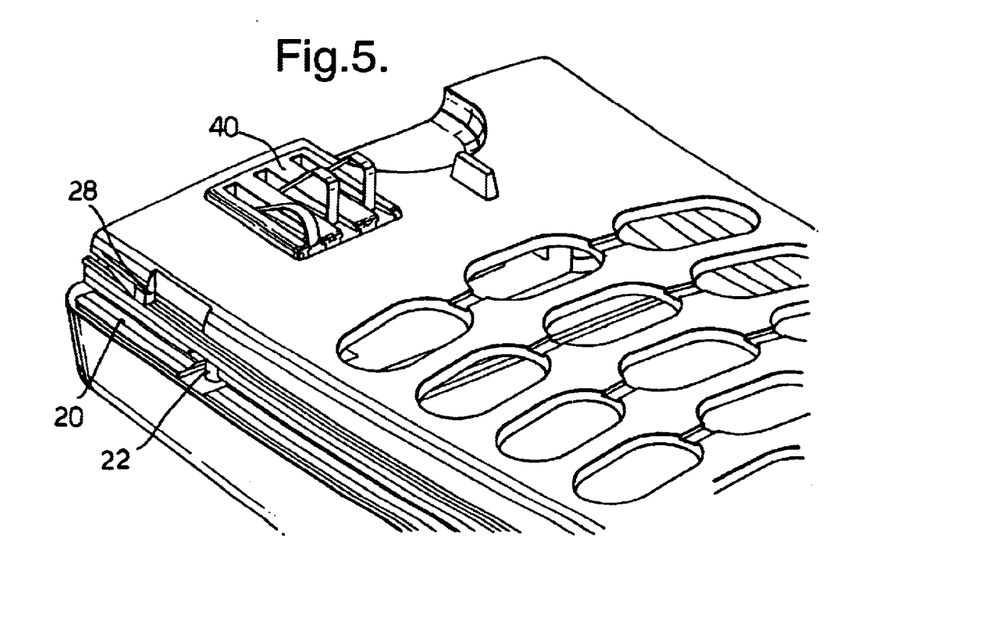
FIG. 5 is partial perspective view of the main body of the radio handset of FIG. 1 with the slide cover removed showing the microphone connector.
Figure 6:
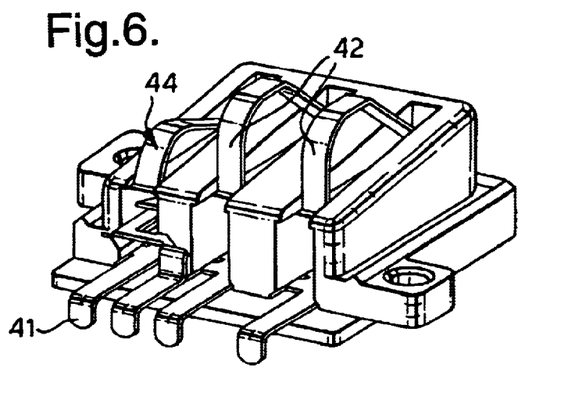
FIG. 6 is a perspective view of the microphone connector of FIG. 4.
Figure 7:
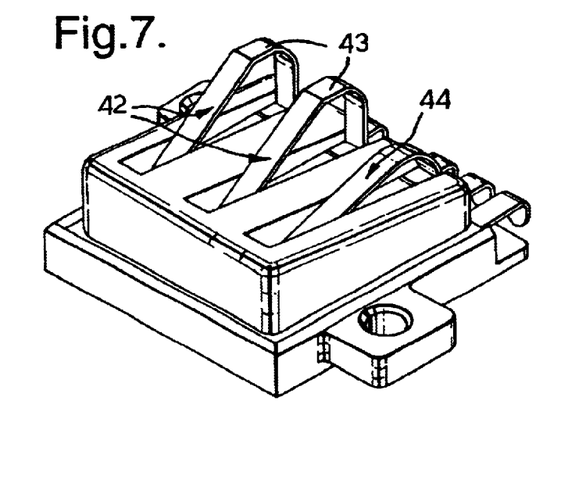
FIG. 7 is a perspective view of the microphone connector of FIG. 4 from the other end.
Figure 8:
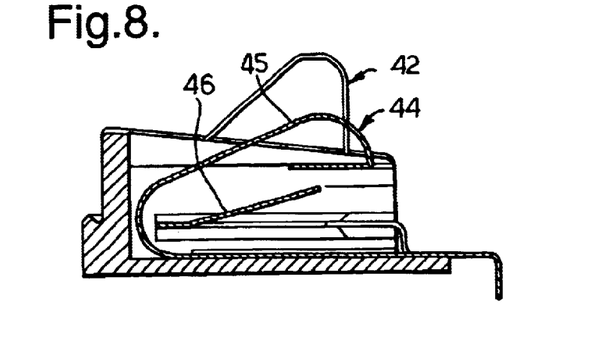
FIG. 8 is a section through the microphone connector of FIGS. 6 and 7.

When in position the two conducting slide tracks 34 extend substantially from one end of the sleeve portion to the other to allow the microphone 15 to maintain electric contact with the electronics of the handset for all positions of the sleeve between and including the open and closed positions. The microphone housing 37 can also suitably be ultrasonically welded to the underside of the sleeve and encloses the microphone and its components to additionally protect from dirt or other damage. When in position, the microphone 15 is located behind the holes 14 at the bottom end of the slide connected to the two slide tracks A microphone connector 40 is mounted on the main body of the handset suitably by ultrasonic welding (FIG. 5). The connector is positioned so that it is in electrical contact with the main pcb in the body of the handset by contacts 41 or other mechanism. It is positioned to make contact with the two slide tracks at all positions of the sleeve for provide an electrical connection between the microphone and the main processor of the handsets. As the microphone is in electrical contact with the main processor via the slide tracks at all times the signals from the microphone can be utilised in the main processor when appropriate for incoming or outgoing calls. The connection is also maintained during movement of the sleeve portion. The handset can, therefore, be used to the extent that the relevant keys are exposed in all positions of the sleeve relative to the main body. The microphone connector can be seen in greater detail in FIGS. 6 to 8.

The microphone connector 40 comprises two spring contacts 42 disposed for contact with respective ones of the two slide tracks. The bearing surfaces 43 of the spring clip are flattened to provide for improved contact with the slide tracks. The spring loading of the contacts ensures good electrical contact between the microphone and microprocessor for a range of distances between the sleeve portion and main body at the microphone connector element. This provides for a good degree of tolerance for the manufacturing process. It also allows the sleeve to be at different distances from the microphone connector for respective positions of the slide.

For reliability it is desirable that the electrical connection between the microphone connector and the slide tracks is hard wearing and resistant to dirt or other damage. In this particular embodiment the connectors are plated with 20 microns of palladium nickel followed by 2 microns of hard gold. The slide tracks 34 can also be plated with hard gold, in this embodiment 5 microns, for improved life.

The microphone connector also has a built-in microswitch 44 which is activated by a protrusion 47 located in the underside of the sleeve portion. The microswitch provides a signal indicating that the sleeve portion is not in the closed position. This signal is used to allow movement of the slide from the closed position to be detectable. This enables movement of the slide to be utilised to answer an incoming call.

The microswitch 44 has a spring loaded member 45 protruding from the main body towards the sleeve cover 3 and a contact arm 46 in alignment with the spring loaded member such that when the spring loaded member is depressed by a sufficient degree contact is made with the contact arm. On such contact a signal is sent to the microprocessor. A protrusion 47 on the underside of the sleeve 3 in a position corresponding to the microswitch when the sleeve is in the closed position is provided on the underside of the sleeve portion. The protrusion 47 has a cammed surface that progressively presses the spring loaded element into contact with the contact arm as the sleeve portion slides towards the closed position. The switch 44 is closed when the sleeve is in the closed position and signals from the switch can, accordingly, be used as an indication as to whether or not the sleeve is in the closed position.

By providing an input from the microswitch to the microprocessor the position of the sleeve portion can be used as an additional indication to the microprocessor. A call can be answered when the sleeve is moved from the closed position, and/or a call terminated when the sleeve is closed.

One of the operating modes of the handset is 'any key answer'. If the handset is in this mode and an incoming call is indicated, the handset can be put in the off-hook condition for receiving the call by pressing any of the exposed keys other than the power key 30 including the volume control key. The only restriction is on which keys are exposed for the user to actuate. When the sleeve portion of the handset is fully open any one of the available keys can be used to answer a call.

When in 'any key answer' mode, if the sleeve is closed, there are two exposed keys, the volume control key 16 and the power control key 50. The handset can be closed and powered up or closed and powered down. If the handset is powered up it is in standby, ie in condition to receive calls. If the handset receives a paging message indicating that there is an incoming call for the handset, the call can be answered in two ways, either by actuating the volume control key or by sliding the sleeve from the closed position. The microprocessor uses the signal from the microswitch to determine that the sleeve is in the closed position. Any signal received from the volume control key when the sleeve is closed can accordingly be utilised to receive an incoming call. Likewise, with the microswitch indicating that the sleeve is closed, moving the sleeve from the closed position causes the microswitch to indicate this displacement to the microprocessor 7. This signal can also then be used to place the handset in the off-hook condition for receiving an incoming call.

When the handset is in a mode other than the any key answer mode, a call must be answered by pressing the send key or, if the sleeve is closed, by displacing the sleeve.

A call can be terminated by pressing the end key, provided it is exposed, or by closing the sleeve. All other functions of the telephone are operable if the keys necessary to actuate the function are exposed for actuation by the user. The microphone and earpiece are connected to the microprocessor for all positions of the slide and the keys are continually polled to determine if they have been actuated.

Figure 13:
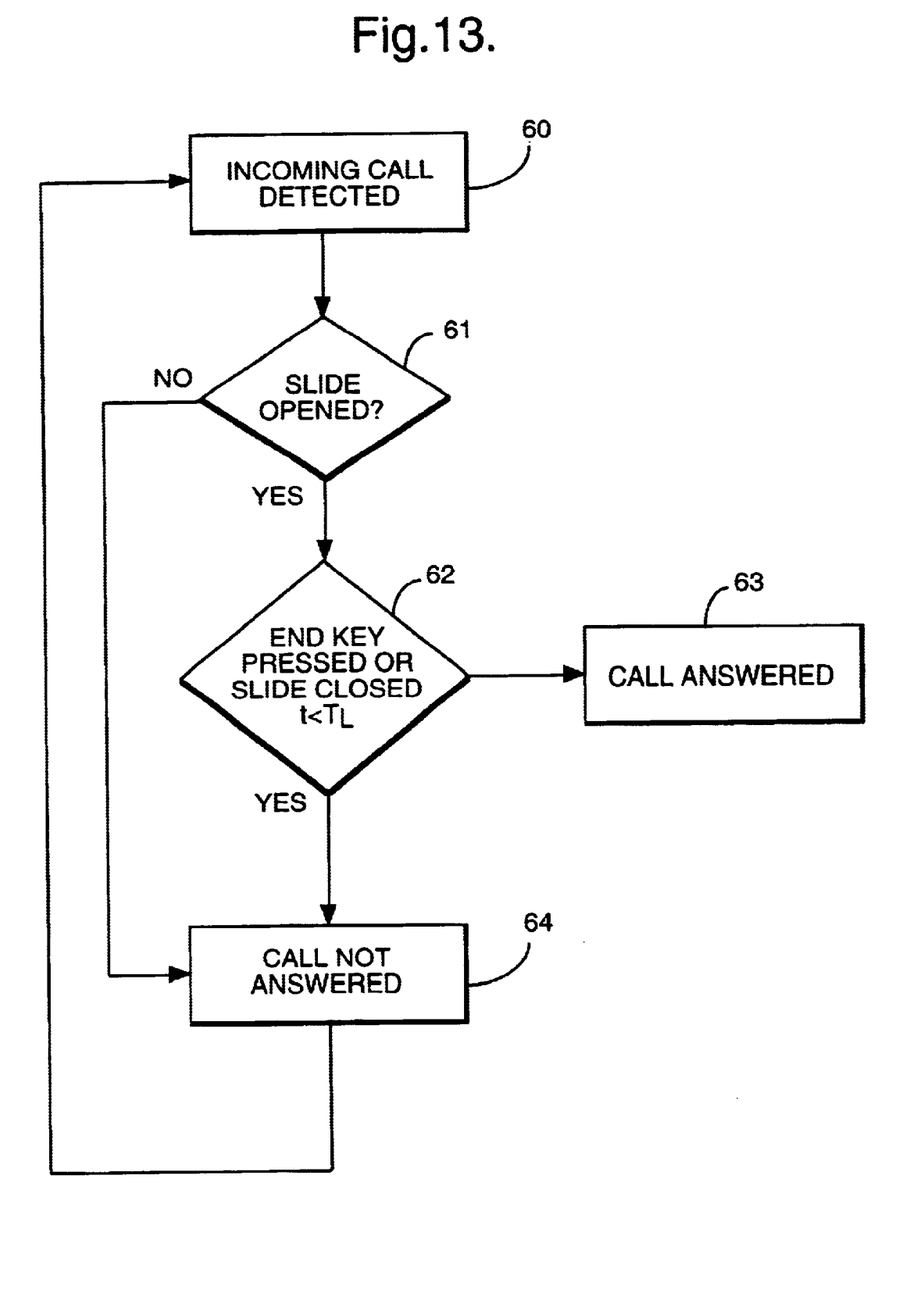
FIG. 13 is a flow chart illustrating a delayed answering feature of an embodiment of the invention.

Operation of the phone using the sleeve portion 3 to answer incoming calls is described with reference to FIG. 13. When the handset detects a paging signal 60 indicating an incoming call, the handset generates a signal alerting the user to the fact that the handset is being paged. This signal may be audible, visible or able to be detected by the user in some way eg felt. The user is then in a position to decide whether or not to answer the call. One option available is for the handset to display an indication of the person calling by reading calling line identification information from the paging signal. This can be displayed on the LCD.

The handset of this embodiment of the invention is able to answer a call received when the sleeve portion is in the closed position if the slide is subsequently opened. The processor determines from the change in status of the signal from the microswitch 44 that the sleeve has been displaced from the closed position ie opened 61. Rather than the call being answered immediately, the processor delays placing the handset in the off-hook condition for a period $T_L$. This period is desirably long enough to allow the user to intervene in the process but not long enough to make it likely that the paging signal will terminate before the call is answered, suitably of the order of 1 second.

Once the sleeve 3 has been opened, the processor 7 checks to see if the END key of the plurality of keys has been actuated or if the sleeve portion 3 has been closed with reference to the signal from the microswitch within the delay period $T_L$ 62. If either the sleeve has been closed, or the END key has been pressed or actuated, the handset is not placed in the off-hook condition to answer the call and continues to ring or otherwise indicate to the user that there is an incoming call 63 until the handset is no longer being paged. If, however, the period $T_L$ expires without either the END key being actuated or the sleeve being closed, the call is answered 64 without further input from the user. This delay of the order one second, allows the user who has inadvertantly slid the sleeve when an incoming call is indicated to override performance of this function by pressing the END key or sliding the sleeve closed again. Other keys could be actuated to override performance of the function indicated by movement of the sleeve from the closed position.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A radio handset comprising a housing having user input means and a processor operable to perform a predetermined function of placing the handset in the off-hook condition in response to user input of a predefined actuation signal, wherein the processor is operable to delay performance of the predetermined function for a period during which user generation of a predefined cancellation signal cancels performance of the predetermined function, the housing comprising a key pad including a plurality of keys mounted on a main body and an extending portion mounted for movement between a first position at which the handset is in the on-hook condition and in which a group of the plurality of keys are concealed and a second position at which the handset is in the off-hook condition and in which the group of the plurality of keys are exposed, and wherein the processor is operable to perform the predetermined function in response to movement of the extending portion toward the second position.

2. A radio handset according to claim 1 wherein user generation of the predefined cancellation signal comprises movement of the extending portion to the first position.

3. A radio handset according to claim 1 wherein user generation of the predefined cancellation signal comprises actuation of any of the plurality of keys.

4. A radio handset according to claim 1 wherein the processor means is operable to perform the predetermined functions corresponding to sequences of actuations of exposed ones of the plurality of keys for a range of positions of the extending portion.

5. A radio handset according to claim 1 wherein the extending portion is mounted for longitudinal slidable movement between the first and second positions.

6. A radio handset according to claim 5 wherein the extending portion can occupy any position intermediate the first and second positions.

7. A radio handset according to claim 5 wherein the main body comprises a first transducer and the extending portion comprises a second transducer, the first and second transducers being operational when the extending portion is in the first and second positions and positions intermediate the first and second positions.

8. A radio handset comprising a housing having a key pad including a plurality of keys mounted on a main body and an extending portion mounted for movement between a first position at which the handset is in the on-hook condition and at which a group of the plurality of keys are concealed and a second position at which the handset is in the off-hook condition and at which the group of the plurality of keys are exposed, and a processor operable to perform a predetermined function of placing the handset in the off-hook condition in response to an incoming call and movement of the extending portion toward the second position, wherein the processor is operable to delay performance of the predetermined function for a period during which generation of a predefined cancellation signal cancels performance of the predetermined function, the main body comprising a first transducer and the extending portion comprising a second transducer, the first and second transducers being operational when the extending portion is in the first and second positions and positions intermediate the first and second positions.

9. A radio handset comprising a housing having user input means and a processor operable to perform a predetermined function of placing the handset in the off-hook condition in response to user input of a predefined actuation signal, wherein the processor is operable to delay performance of the predetermined function for a period during which user generation of a predefined cancellation signal cancels performance of the predetermined function and after which the handset remains operational.

10. A radio handset according to claim 9 wherein the housing comprises a key pad including a plurality of keys mounted on a main body and an extending portion mounted for movement between a first position in which a group of the plurality of keys are concealed and a second position in which the group of the plurality of keys are exposed, and wherein the processor is operable to perform the predetermined function in response to movement of the extending portion.

11. A radio handset according to claim 10 wherein user generation of the predefined cancellation signal comprises movement of the extending portion to the first position.

12. A radio handset according to claim 11 wherein movement of the extending portion from the first position causes the handset to be placed in the off-hook condition.

13. A radio handset according to claim 10 wherein movement of the extending portion to the first position causes the handset to be placed in the on-hook condition.

14. A radio handset according to claim 10 wherein the processor is operable to perform the predetermined functions corresponding to sequences of actuations of exposed ones of the plurality of keys for a range of positions of the extending portion.

15. A radio handset according to claim 10 wherein the extending portion is mounted for longitudinal slidable movement between the first and second positions.

16. A radio handset according to claim 15 wherein the extending portion can occupy any position intermediate the first and second positions.

17. A radio handset according to claim 9 wherein user generation of the predefined cancellation signal comprises actuation of any of the plurality of keys.

18. A radio handset comprising a housing having user input means and a processor operable to perform a predetermined function in response to user input of a predefined actuation signal, wherein the processor is operable to delay performance of the predetermined function for a period during which user generation of a predefined cancellation signal cancels performance of the predetermined function.

19. A radio handset operable so that on receiving an incoming call the handset generates a signal alerting the user to the received incoming call, the handset having user input means and a processor, the user input means comprising:

a first user input operable to place the handset in an off hook condition so as to answer the received incoming call, and a second user input operable to cancel the placing of the handset in the off hook condition, and a processor comprising:

call answering means configured to initiate placing of the handset in the off hook condition in response to user actuation of the first user input means, call answering delay means responsive to activation of the call answer means and configured to delay the call answering means for a predetermined period of time, and call cancellation means configured to cancel answering of the incoming call in response to user actuation of the second user input during the predetermined delay period, and subsequently to continue to deal with the incoming call as if untreated by the user.

\* \* \* \* \*